US010641013B2

(12) United States Patent
Yates et al.

(10) Patent No.: US 10,641,013 B2
(45) Date of Patent: May 5, 2020

(54) PORTABLE LOCK WITH INTEGRITY SENSORS

(71) Applicant: Go Lock Technology, Inc., Spicewood, TX (US)

(72) Inventors: Douglas A. Yates, Spicewood, TX (US); Steven R. Jones, Spicewood, TX (US); Frank Murtland, Fort Worth, TX (US); Edward J. Gross, Austin, TX (US)

(73) Assignee: Go Lock Technology, Inc., Spicewood, TX (US)

( * ) Notice: Subject to any disclaimer, the term of this patent is extended or adjusted under 35 U.S.C. 154(b) by 0 days.

(21) Appl. No.: 15/998,905

(22) PCT Filed: Feb. 16, 2017

(86) PCT No.: PCT/US2017/018215
§ 371 (c)(1),
(2) Date: Aug. 16, 2018

(87) PCT Pub. No.: WO2017/143093
PCT Pub. Date: Aug. 24, 2017

(65) Prior Publication Data
US 2019/0345741 A1    Nov. 14, 2019

Related U.S. Application Data

(60) Provisional application No. 62/296,011, filed on Feb. 16, 2016.

(51) Int. Cl.
*E05B 67/00* (2006.01)
*E05B 73/00* (2006.01)
(Continued)

(52) U.S. Cl.
CPC ........ *E05B 67/003* (2013.01); *E05B 73/0005* (2013.01); *G07C 9/00571* (2013.01); *E05B 45/005* (2013.01)

(58) Field of Classification Search
CPC .... E05B 67/003; E05B 73/0005; E05B 67/00; G07C 9/00571
(Continued)

(56) References Cited

U.S. PATENT DOCUMENTS 3,754,419 A    8/1973  Taylor
4,027,276 A    5/1977  Shaughnessy
(Continued)

FOREIGN PATENT DOCUMENTS

CN    103896122 A    7/2014
EP    2299251 A1    3/2011
(Continued)

OTHER PUBLICATIONS

USPTO as International Searching Authority (ISA); International Search Report and Written Opinion of the ISA; pp. 1-12; dated Jun. 6, 2017 (dated Jun. 6, 2017) (USPTO Alexandria, Virginia US).
(Continued)

*Primary Examiner* — Suzanne L Barrett
(74) *Attorney, Agent, or Firm* — Culhane Meadows PLLC

(57) ABSTRACT

Disclosed herein are lock assemblies that include, in particular embodiments, a cable assembly, a housing, a sensor assembly, and a wireless transceiver. The cable assembly includes a cable having a sensor element disposed along its length, a first shackle pin on its first end, and a second shackle pin on its opposing end. The housing defines a first pinway for receiving the first shackle pin, a second pinway for receiving the second shackle pin, and a locking mechanism for securing the shackle pins to the housing. The sensor assembly is located within the housing and in communica-
(Continued)

tion with the cable assembly for sensing a cable type and a cable condition related to the cable assembly. The wireless transceiver is connected to a power source, in communication with the sensor assembly, and operated by a microcontroller within the housing.

5 Claims, 11 Drawing Sheets

(51) Int. Cl.
  *G07C 9/00* (2020.01)
  *E05B 45/00* (2006.01)
(58) Field of Classification Search
  USPC .......................................................... 70/53
  See application file for complete search history.

(56) References Cited

U.S. PATENT DOCUMENTS

| | | |
|---|---|---|
| 4,032,848 A | 6/1977 | Shaughnessy |
| 4,095,211 A | 6/1978 | Shaughnessy |
| 4,188,614 A | 2/1980 | Habib, Jr. |
| 4,229,811 A | 10/1980 | Salem |
| 4,242,743 A | 12/1980 | Salem |
| 4,260,928 A | 4/1981 | Salem |
| 4,531,115 A | 7/1985 | Black et al. |
| 4,538,107 A | 8/1985 | Varone |
| 4,576,022 A | 3/1986 | Gamble |
| 4,626,799 A | 12/1986 | Matievic |
| 4,672,365 A | 6/1987 | Gehman et al. |
| 4,682,155 A | 7/1987 | Shirley |
| 4,734,680 A | 3/1988 | Gehman et al. |
| 4,737,771 A | 4/1988 | Coash |
| 4,755,792 A | 7/1988 | Pezzolo et al. |
| 4,965,909 A | 6/1990 | Matievic |
| 5,066,943 A | 11/1991 | Demirel |
| 5,268,670 A | 12/1993 | Brasch et al. |
| 5,477,152 A | 12/1995 | Hayhurst |
| 5,699,065 A | 12/1997 | Murray |
| D391,469 S | 3/1998 | Foushee |
| 5,852,402 A | 12/1998 | Perry |
| 5,898,397 A | 4/1999 | Murray |
| 5,959,532 A | 9/1999 | Fujiuchi et al. |
| 6,166,644 A | 12/2000 | Stroda |
| 6,439,008 B1 | 8/2002 | Keil |
| 6,570,498 B1 | 5/2003 | Frost et al. |
| 6,578,393 B2 | 6/2003 | Yarborought |
| 6,684,668 B1 | 2/2004 | Hsueh Lee |
| 6,720,861 B1 | 4/2004 | Rodenbeck et al. |
| 6,731,908 B2 | 5/2004 | Berliner et al. |
| 6,813,770 B1 | 10/2004 | Pereira et al. |
| 6,859,761 B2 | 2/2005 | Bensky et al. |
| 6,961,541 B2 | 11/2005 | Overy et al. |
| 6,963,289 B2 | 11/2005 | Aljadeff et al. |
| 6,968,194 B2 | 11/2005 | Aljadeff et al. |
| D523,729 S | 6/2006 | Gorst |
| D527,296 S | 8/2006 | Concari |
| 7,104,091 B2 | 9/2006 | Kuhblank |
| 7,123,030 B2 | 10/2006 | Robar et al. |
| 7,155,783 B2 | 1/2007 | Nessel et al. |
| 7,178,205 B2 | 2/2007 | Nessel et al. |
| D539,181 S | 3/2007 | Concari |
| D545,710 S | 7/2007 | Concari |
| D545,760 S | 7/2007 | Concari |
| 7,253,733 B2 | 8/2007 | Krieger |
| 7,274,293 B2 | 9/2007 | Bradus et al. |
| 7,295,115 B2 | 11/2007 | Aljadeff et al. |
| 7,296,447 B2 | 11/2007 | Priest et al. |
| 7,319,395 B2 | 1/2008 | Puzio et al. |
| 7,319,398 B2 | 1/2008 | Marino |
| 7,337,963 B2 | 3/2008 | Harper et al. |
| 7,339,475 B2 | 3/2008 | Concari et al. |
| 7,339,477 B2 | 3/2008 | Puzio et al. |
| 7,343,328 B1 | 3/2008 | Smith et al. |
| 7,391,315 B2 | 6/2008 | Friar |
| 7,391,326 B2 | 6/2008 | Puzio et al. |
| 7,403,108 B2 | 7/2008 | Aljadeff et al. |
| D581,303 S | 11/2008 | Concari |
| 7,454,826 B2 | 11/2008 | Nessel et al. |
| 7,525,411 B2 | 4/2009 | Strader et al. |
| 7,543,467 B2 | 6/2009 | Sheehan |
| 7,648,065 B2 | 1/2010 | Marino |
| 7,649,464 B2 | 1/2010 | Puzio et al. |
| 7,665,289 B2 | 2/2010 | DeAngelis |
| 7,669,765 B2 | 3/2010 | Harper et al. |
| 7,675,413 B2 | 3/2010 | Watts et al. |
| 7,692,542 B2 | 4/2010 | Outzs |
| 7,750,811 B2 | 7/2010 | Puzio et al. |
| 7,753,272 B2 | 7/2010 | Harper et al. |
| 7,832,064 B2 | 11/2010 | Nessel et al. |
| 7,866,245 B2 | 1/2011 | Kempf et al. |
| 7,916,036 B1 | 3/2011 | Pope et al. |
| 7,926,215 B2 | 4/2011 | Riker et al. |
| 7,961,088 B2 | 6/2011 | Watts et al. |
| D640,911 S | 7/2011 | Yang |
| D642,119 S | 7/2011 | Baetica et al. |
| 7,986,228 B2 | 7/2011 | Friar et al. |
| 8,002,180 B2 | 8/2011 | Harper et al. |
| 8,103,047 B1 | 1/2012 | Griess et al. |
| 8,218,810 B1 | 7/2012 | Griess et al. |
| 8,248,226 B2 | 8/2012 | Fiar |
| 8,264,322 B2 | 9/2012 | Rodenbeck et al. |
| 8,313,024 B2 | 11/2012 | Marino |
| 8,358,198 B2 | 1/2013 | Harper et al. |
| 8,360,208 B2 | 1/2013 | DeAngelis |
| 8,531,286 B2 | 9/2013 | Friar et al. |
| 8,665,064 B1 | 3/2014 | Rodenbeck et al. |
| 8,746,074 B2 | 6/2014 | Lambert |
| 8,850,858 B2 | 10/2014 | Nave |
| 8,870,078 B2 | 10/2014 | Webb et al. |
| D719,012 S | 12/2014 | Alexander |
| 8,928,463 B2 | 1/2015 | Landau et al. |
| D731,873 S | 6/2015 | Harder |
| 9,089,952 B2 | 7/2015 | Gatling et al. |
| 9,115,511 B1 | 8/2015 | Schmidt et al. |
| 9,189,663 B2 | 11/2015 | Goren et al. |
| 9,390,572 B2 | 7/2016 | Almomani |
| 9,406,181 B2 | 8/2016 | Almomani |
| 9,424,700 B2 | 8/2016 | Lovett et al. |
| 9,449,268 B2 | 9/2016 | Goren et al. |
| 9,547,965 B2 | 1/2017 | Goren et al. |
| 9,633,551 B2 | 4/2017 | Aljadeff et al. |
| 9,639,722 B2 | 5/2017 | Landau et al. |
| 9,672,708 B2 | 6/2017 | Goren et al. |
| 9,691,207 B2 | 6/2017 | Almomani |
| 9,697,302 B2 | 7/2017 | Nguyen et al. |
| 2003/0228846 A1 | 12/2003 | Berliner et al. |
| 2004/0066202 A1 | 4/2004 | Pereira et al. |
| 2004/0119583 A1 | 6/2004 | Linden et al. |
| 2005/0079756 A1 | 4/2005 | Kawai et al. |
| 2005/0116120 A1 | 6/2005 | Maruyama |
| 2005/0242246 A1 | 11/2005 | Maruyama |
| 2006/0109103 A1 | 5/2006 | Bradus |
| 2006/0123229 A1 | 6/2006 | Holloway et al. |
| 2006/0139861 A1 | 6/2006 | Krieger et al. |
| 2006/0283216 A1 | 12/2006 | Marcelle et al. |
| 2007/0262853 A1 | 11/2007 | Bradus et al. |
| 2008/0068159 A1 | 3/2008 | Bradus et al. |
| 2008/0126126 A1 | 5/2008 | Ballai |
| 2008/0242945 A1 | 10/2008 | Gugliotti et al. |
| 2009/0033491 A1 | 2/2009 | Saunders |
| 2009/0102610 A1 | 4/2009 | Lance |
| 2009/0160427 A1 | 6/2009 | Drake et al. |
| 2009/0236486 A1 | 9/2009 | Matsuno et al. |
| 2009/0273465 A1 | 11/2009 | Shamir et al. |
| 2010/0033325 A1 | 2/2010 | Vilkomirski et al. |
| 2011/0195701 A1 | 8/2011 | Cook et al. |
| 2014/0020295 A1 | 1/2014 | Bonahoom et al. |
| 2014/0113563 A1 | 4/2014 | Almomani et al. |
| 2014/0157842 A1 | 6/2014 | Almomani et al. |
| 2014/0176305 A1 | 6/2014 | Aljadeff |
| 2014/0267740 A1 | 9/2014 | Almomani et al. |

(56) References Cited

U.S. PATENT DOCUMENTS

| | | | |
|---|---|---|---|
| 2015/0091696 | A1 | 4/2015 | Fisher |
| 2015/0197408 | A1 | 7/2015 | St. Germain |
| 2016/0110637 | A1 | 4/2016 | Lehovetzki |
| 2016/0117899 | A1 | 4/2016 | Chevalier et al. |
| 2016/0140432 | A1 | 5/2016 | Lehovetzki |
| 2017/0058565 | A1* | 3/2017 | Sanchez ............... E05B 45/061 |
| 2017/0098335 | A1 | 4/2017 | Payack, Jr. |
| 2017/0206385 | A1 | 7/2017 | Barney |
| 2019/0345741 | A1* | 11/2019 | Yates .................... E05B 67/003 |

FOREIGN PATENT DOCUMENTS

| | | |
|---|---|---|
| WO | WO 2005/028790 A1 | 3/2005 |
| WO | WO 2014/012564 A1 | 1/2014 |
| WO | WO 2014/012677 A1 | 1/2014 |
| WO | WO 2017/123949 A1 | 7/2017 |

OTHER PUBLICATIONS

Attorney for Go Lock Technology, Inc.; Amendments under Article 34; total of 14 pages; submitted in International Application PCT/US2017/018215 "Portable Lock with Integrity Sensors" on Sep. 15, 2017 (Sep. 15, 2017) (USPTO Alexandria Virginia US).

USPTO as International Searching Authority (ISA); International Preliminary Report on Patentability; pp. 1-4; dated Feb. 5, 2018 (dated Feb. 5, 2018) (USPTO Alexandria, Virginia US).

USPTO as International Searching Authority (ISA); International Search Report and Written Opinion of the ISA; pp. 1-8; dated Mar. 26, 2018 (dated Mar. 26, 2018) (USPTO Alexandria, Virginia US).

USPTO; Office Action (non-final); issued for U.S. Appl. No. 29/589,832, filed by Keller et al.; submitting cover page, Office Action Summary, Detailed Action, and Notice of References Cited; total of 5 pages; relevant passages include those on pp. 3-4; dated Nov. 1, 2017 (dated Nov. 1, 2017) (USPTO Alexandria, Virginia).

Attorney for Keller et al.; Amendment and Response to Office Action; total of 6 pages; relevant passages include those on pp. 2-6; submitted in U.S. Appl. No. 29/589,832 dated Jan. 26, 2018 (dated Jan. 26, 2018) (USPTO Alexandria, Virginia).

USPTO; Notice of Allowance; issued for U.S. Appl. No. 29/589,832, filed by Keller et al.; submitting Notice of Allowance and Fee(s) Due and Notice of Allowability for Design Application; total of 6 pages; relevant passages include those on pp. 5-6; dated Feb. 26, 2018 (dated Feb. 26, 2018) (USPTO Alexandria, Virginia).

CIPO (Canada Intellectual Property Office); Examiner's Report; issued for Canada Application 175,754; total of 2 pages; relevant passages include those on pp. 1-2; dated Feb. 20, 2018 (dated Feb. 20, 2018) (CIPO Gaineau, Québec, Canada).

Attorney for Go Lock Technology, Inc.; Letter with amendments; total of 12 pages; relevant passages include those on pp. 1-12; submitted in Canada Application 175,754 dated Apr. 15, 2018 (dated May 14, 2018) (CIPO Gaineau, Québec, Canada).

Attorney for Keller et al.; Preliminary Amendment; total of 16 pages; submitted in U.S. Appl. No. 29/648,661 (a Continuation of U.S. Appl. No. 29/589,832) dated May 23, 2018 (dated May 23, 2018) (USPTO Alexandria, Virginia).

DeWalt DS500S MobileLock Portable Alarm with GPS, "Product & Accessories," archived webpage at http://www.DeWaltMobileLock.com:80/product -overview-and-specs, dated Nov. 8, 2014 (Nov. 8, 2014) captured via Internet Archive (https://web.archive.org).

DeWalt MobileLock "Portable Alarm Features," archived webpage at http://www.DeWaltMobileLock.com:80/product -portable-alarm-features, dated Nov. 19, 2014 (Nov. 19, 2014) captured via Internet Archive (https://web.archive.org).

* cited by examiner

PORTABLE LOCK WITH INTEGRITY SENSORS

CROSS-REFERENCE TO RELATED APPLICATIONS

The present application claims the benefit of and priority to U.S. Provisional Application 62/296,011 filed Feb. 16, 2016, entitled "Portable Lock With Integrity Sensors" which is incorporated herein by reference in its entirety.

TECHNICAL FIELD

Certain disclosed embodiments relate to the field of portable locking devices.

BACKGROUND

Existing portable locking devices, such as padlocks, are generally limited to operation with a shackle that is permanently connected at one end to the lock body, or with one specific type of shackle element. Existing cables and cable-like shackle assemblies are equipped with only rudimentary sensors for monitoring and detecting the condition of the cable. Padlocks with wireless capability typically report condition using a simple, binary message (for example, Lock OK or Lock Not OK) and lack the capacity to transmit or receive signals in remote areas.

Thus, there is need in the art for improved portable locking devices.

SUMMARY

According to some embodiments, a lock assembly includes a cable assembly comprising a cable having a sensor element disposed along its length, a first shackle pin on its first end, and a second shackle pin on its opposing end; a housing defining a first pinway for receiving the first shackle pin, a second pinway for receiving the second shackle pin, and a locking mechanism for securing the shackle pins to the housing; a sensor assembly within the housing and in communication with the cable assembly for sensing a cable type and a cable condition related to the cable assembly; and a wireless transceiver connected to a power source, in communication with the sensor assembly, and operated by a microcontroller within the housing, wherein the transceiver is configured to communicate with a remote mobile device and a remote server.

According to some embodiments, a smart cable assembly includes a sensor element disposed along a length of cable, the sensor element comprising a resistive wire, carbon filaments, or a coaxial conductive element; and a cable sensor array in communication with a microcontroller and a power source, the sensory array comprising at least one of (a) a cable type sensor for detecting cable type and length, and (b) a cable status sensor for detecting cable integrity.

According to some embodiments, a secure mesh communication network includes one or more remote lock assemblies, each including a wireless transceiver and a microcontroller; an access system configured to allow a user to communicate with and select the one or more remote lock assemblies for participation in a defined mesh; and a mesh control system in communication with each the microcontroller and configured to coordinate and control a transfer of signals between and among the one or more remote lock assemblies, one or more remote servers, and one or more remote mobile devices, wherein the signals are encrypted or otherwise secured.

BRIEF DESCRIPTION OF THE DRAWING

Features of the various embodiments disclosed will become more apparent in the following detailed description, in which reference is made to the appended drawing figures, which are incorporated in and constitute a part of this specification, and wherein.

Corresponding reference numbers indicate corresponding parts or elements throughout the several views of the drawing.

DETAILED DESCRIPTION OF VARIOUS EMBODIMENTS

Figure 1A:
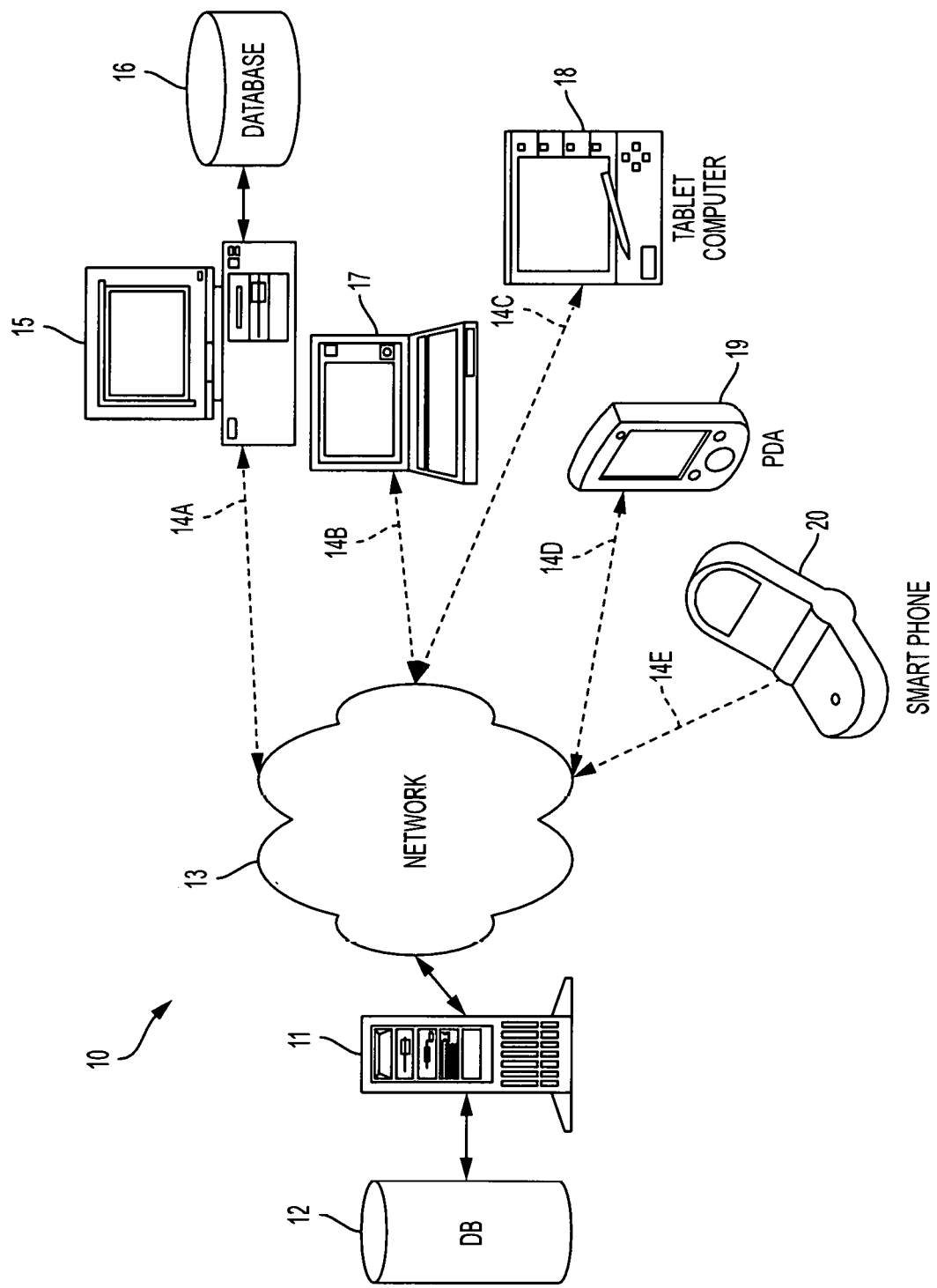
FIG. 1A is a diagram illustrating an exemplary network in which systems and methods consistent with the disclosed embodiments may be implemented.

The present systems and apparatuses and methods are understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

Like parts are marked throughout the following description and drawings with the same reference numerals. The drawings may not be to scale and certain features may be shown exaggerated in scale or in somewhat schematic format in the interest of clarity, conciseness, and to convey information.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to a component can include two or more such components unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Computer System Overview

FIG. 1A illustrates an example of the basic components of a computer system 10 including an access system 60 for use in connection with a preferred embodiment. As shown, the system 10 includes a server 11 and one or more remote devices 15, 17, 18, 19, 20 including wireless mobile devices.

Each remote device 15, 17-20 includes applications and each device may have access to a local database 16. The server 11 includes applications and a database 12 that may be accessed by remote devices 15, 17-20 via connections 14(A-E), respectively, over a network 13. The server 11 runs administrative software for a computer network and controls access to itself and to the database 12. The remote devices 15, 17-20 may access the database 12 over a network 13. The network 13 may include but is not limited to the Internet, a local area network (LAN), a wide area network (WAN), a telephone line using a modem (POTS), Bluetooth, WiFi, cellular, optical, satellite, RF, Ethernet, magnetic induction, coax, RS-485, and the like, or other like networks. The server 11 may also be connected to the local area network (LAN) within an organization.

The remote devices 15, 17-20 may each be located at a location remote from the server 11. Remote devices 15, 17-20 include but are not limited to PCs, desktop computers, workstations, printers, WAP devices, non-WAP devices, and any of a variety of mobile computing devices such as handheld computers, laptop computers, tablet computers, personal digital assistants (PDAs), pagers, mobile telephone, and the like.

Figure 1B:
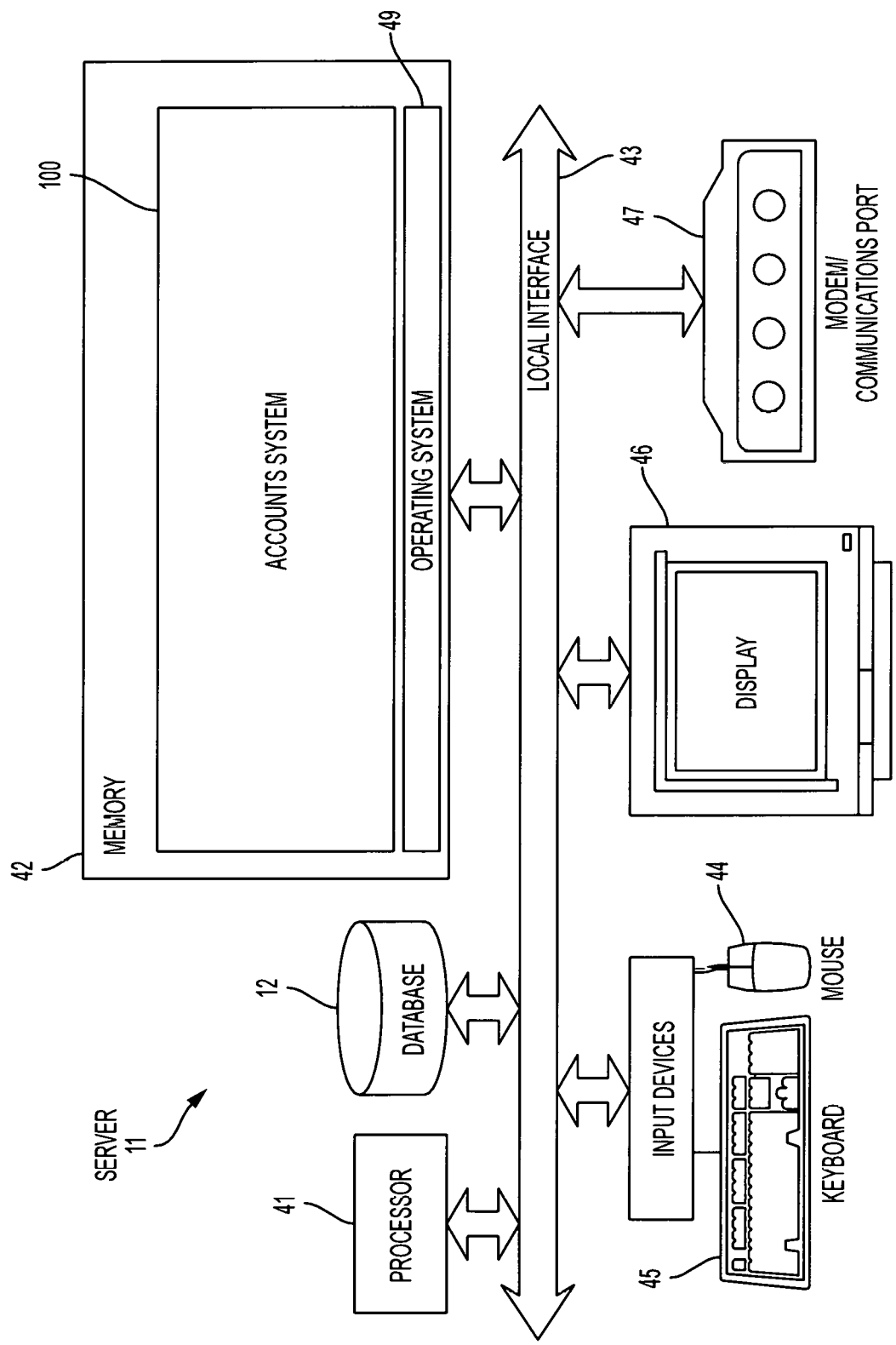
FIG. 1B is a diagram illustrating an exemplary server, with which systems and methods consistent with the disclosed embodiments may be implemented.

FIG. 1B is a block diagram illustrating the functional elements of a server 11, such as the one shown in FIG. 1A. The server 11 includes but is not limited to a workstation, desktop computer, PC, and any of a variety of mobile computer devices.

Generally, in terms of hardware architecture, as shown in FIG. 1B, the server 11 may include a processor 41, memory 42, and one or more input and/or output (I/O) devices (or peripherals) that are communicatively coupled via a local interface 43. The local interface 43 may be, for example, but is not limited to, one or more buses or other wired or wireless connections, as is known in the art. The local interface 43 may have additional elements to facilitate communications, which are omitted for simplicity, such as controllers, buffers (caches), drivers, repeaters, and receivers. Moreover, the local interface 43 may include address, control, and/or data connections to enable appropriate communications among the aforementioned components.

The processor 41 is a hardware device for executing software that can be stored in memory 42. The processor 41 can be virtually any custom-made or commercially available processor, a central processing unit (CPU), data signal processor (DSP), or an auxiliary processor, among several processors associated with the server 11; and a semiconductor based microprocessor (in the form of a microchip) or a macro-processor. Examples of suitable commercially available microprocessors include but are not limited to: an 80×86, Pentium series, or later-series microprocessor from Intel Corporation, a PowerPC microprocessor from IBM, a SPARC microprocessor from Oracle Corporation (formerly Sun Microsystems, Inc.), a PA-RISC series microprocessor from Hewlett-Packard Company, or a 68000 or 88000 series microprocessor from Freescale Semiconductor, Inc. (formerly Motorola, Inc.).

The memory 42 may include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 1B, the software in the memory 42 includes a suitable operating system (O/S) 49 and one or more programs on the accounts system 100.

A non-exhaustive list of examples of a commercially available and suitable operating system 49 includes: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation). The operating system 49 essentially controls the execution of other computer programs, such as the accounts system 100, and provides scheduling, input-output control, file and data management, memory management, and communication control and related services.

The accounts system 100 may be a source program, an executable program (object code), a script, or any other entity comprising a set of instructions to be performed. For embodiments in which it is a source program, then the program is usually translated via a compiler, assembler, interpreter, or the like, which may or may not be included within the memory 42, so as to operate properly in connection with the operating system 49. Moreover, the accounts system 100 may be written as (a) an object-oriented programming language, which has classes of data and methods, or (b) a procedure programming language, which has routines, subroutines, and/or functions, for example but not limited to, C, C #, Pascal, BASIC, API calls, HTML, XHTML, XML, ASP scripts, FORTRAN, COBOL, Perl, Java, ADA, .NET, and the like.

The input/output (I/O) devices may include any of a variety of input devices, including but not limited to a mouse 44, keyboard 45, scanner (not shown), microphone (not shown), touch-sensitive screen (on the display 46), a gesture-responsive interface, and any of a variety of other input devices. Moreover, the I/O devices may also include output devices, including but not limited to a printer (not shown), the display 46, etc. Finally, the I/O devices may further include devices that communicate both inputs and outputs, including instance but not limited to a network interface controller (NIC) or a modem (modulator/demodulator) 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device, or the like, the software in the memory 42 may further include a basic input output system (BIOS) (omitted for simplicity). The BIOS is a set of essential software routines that initialize and test hardware at startup, start the operating system 49, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 are pursuant to the software. The accounts system 100 and the operating system 49 are read, in whole or in part, by the processor 41, perhaps buffered within the processor 41, and then executed.

The accounts system 100 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" includes any means that can store, communicate, propagate, or transport a program for use by or in connection with an instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method. More specific examples of a computer-readable medium, in a non-exhaustive list, includes the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), because the program can be electronically captured, via for instance optical scanning of the paper or other medium, then compiled, interpreted or otherwise processed in a suitable manner if necessary, and then stored in a computer memory.

In an alternative embodiment, the accounts system 100 may be implemented in hardware, using for example any one or a combination of the following technologies, each of which is well known in the art: one or more discrete logic circuits having logic gates for implementing logic functions upon data signals, an application specific integrated circuit (ASIC) having appropriate combinational logic gates, one or more programmable gate array (PGA), a field programmable gate array (FPGA), and the like.

Figure 1C:
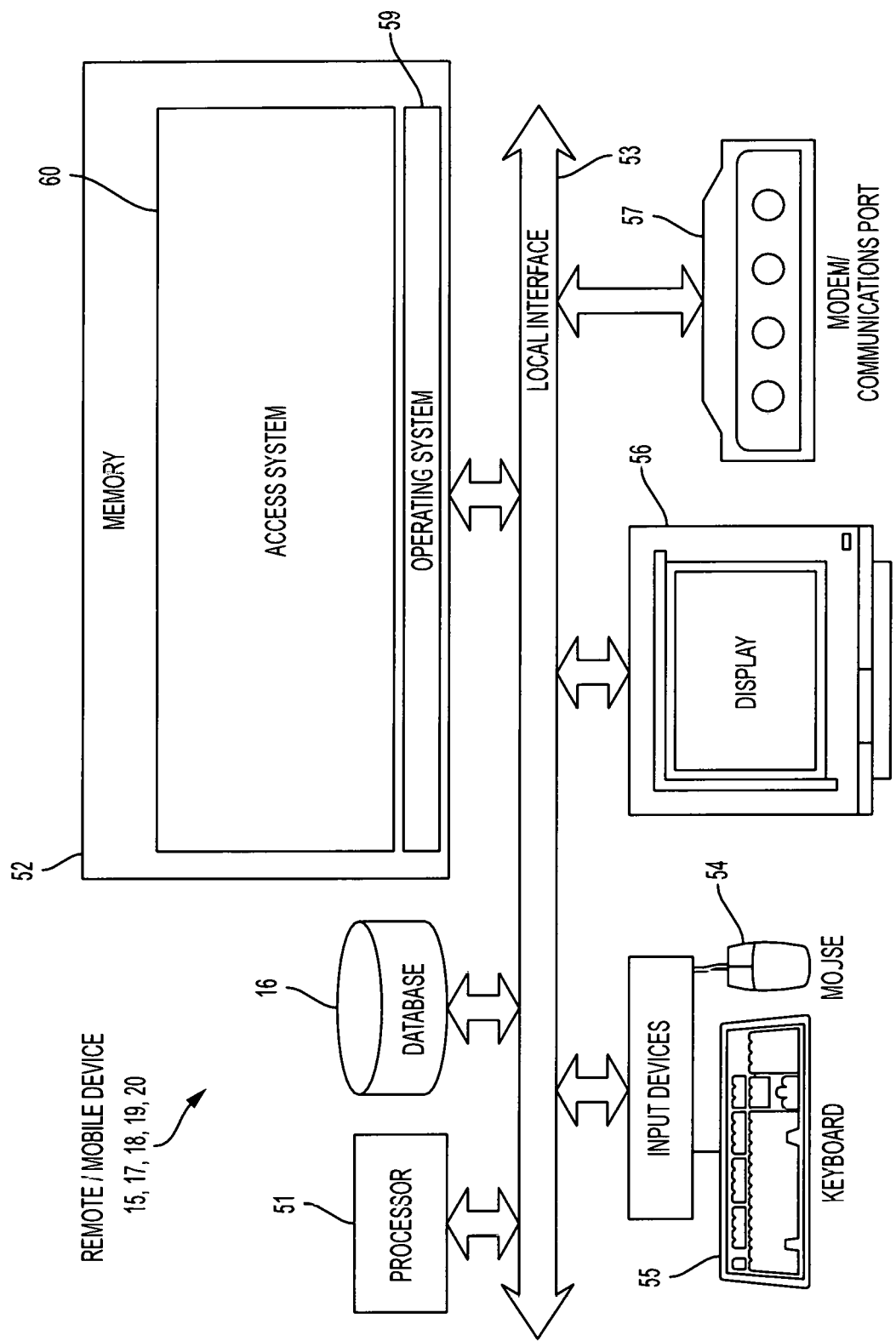
FIG. 1C is a diagram illustrating a remote or mobile device, with which systems and methods consistent with the disclosed embodiments may be implemented.

FIG. 1C is a block diagram illustrating the functional elements of the one or more remote devices 15, 17-20 that facilitate access to and operation of an access system 60. As illustrated, the elements in each remote device 15, 17-20 are similar in type, function, and operation to those described with respect to the server 11 in FIG. 1B. In the embodiment shown, the access system 60 may be installed on and operated by the remote device 15, 17-20. Hereinafter, the remote devices 15, 17-20 will be referred to as mobile device 15 for the sake of brevity.

The mobile device 15 may include a processor 51, a memory 52, and one or more input and/or output (I/O) devices (or peripherals) that are communicatively coupled via a local interface 53. The I/O devices include any of a variety of input devices, including but not limited to a mouse 54, keyboard 55, a touch-sensitive screen (on the display 56), a gesture-responsive interface, and any of a variety of other input devices. The memory 52, as described herein, may include a volatile memory cache.

The access system 60 may be a source program, an executable program (object code), a script, or any other entity comprising a set of instructions to be performed. For embodiments in which the access system 60 is a source program, the program is usually translated via a compiler, assembler, interpreter, or the like, which may or may not be included within the memory 52, so as to operate properly in connection with the operating system 59. Moreover, the access system 60 may be written as (a) an object-oriented programming language, which has classes of data and methods, or (b) a procedure programming language, which has routines, subroutines, and/or functions, for example but not limited to, C, C++, C #, Pascal, BASIC, API calls, HTML, XHTML, XML, ASP scripts, FORTRAN, COBOL, Perl, Java, ADA, .NET, and the like.

Portable Lock Assemblies

Although many of the systems and methods described herein are discussed in the context of a portable locking device with a cable, the technology disclosed herein is also useful and applicable in a variety of other contexts. For example, the devices and systems described herein would be useful and applicable for all types of locks and security devices where wireless connectivity and functionality would be beneficial.

Figure 2:
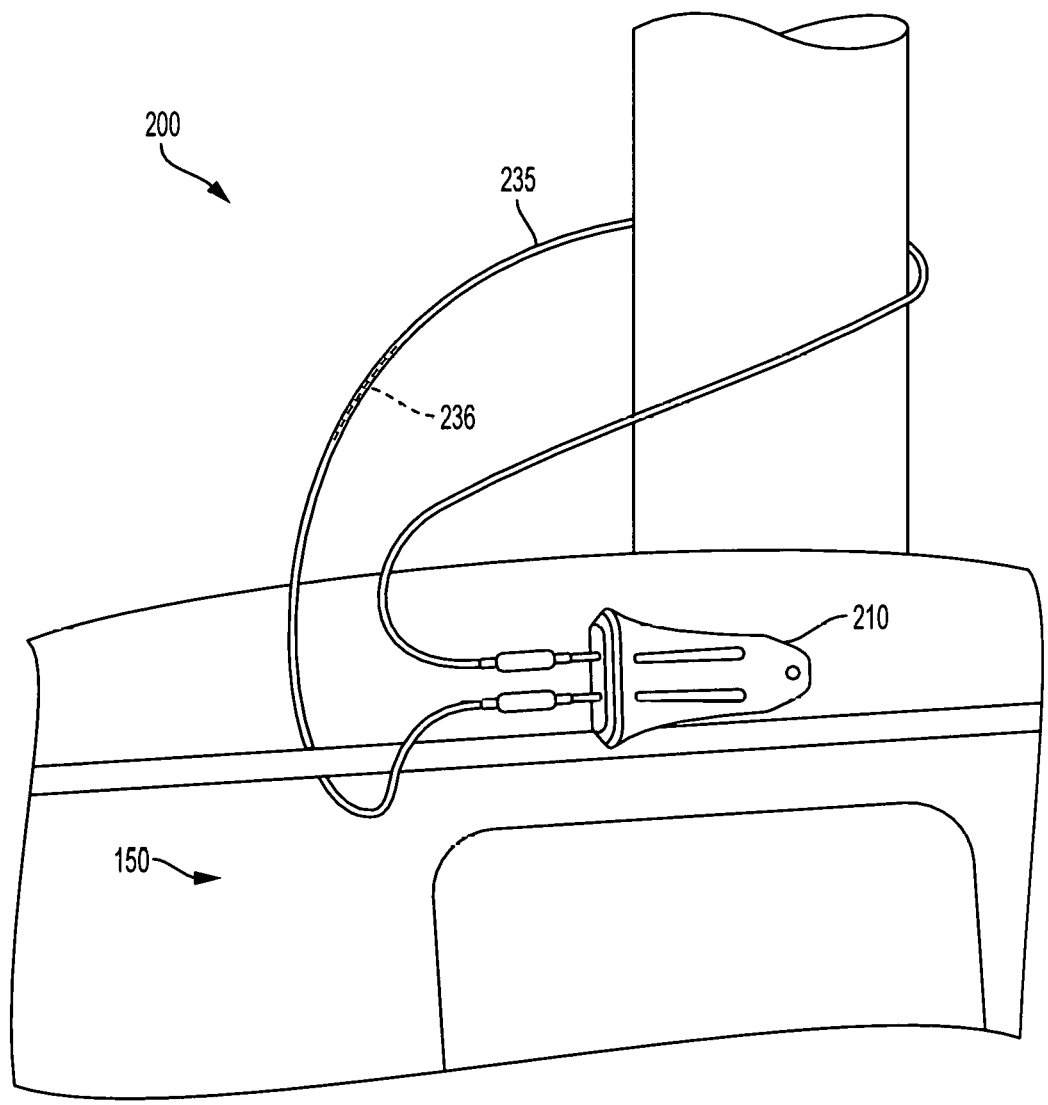
FIG. 2 is a perspective illustration of an item of personal property, such as a kayak, secured by the cable of a lock assembly, according to particular embodiments.

FIG. 2 is a perspective illustration of an item of personal property 150, such as a kayak, secured by the cable 235 of a lock assembly 200, according to particular embodiments. As shown, the housing 210 of the lock assembly 200 is resting on the kayak's rail and the cable 235 extends around a tree or post. In use, the lock assembly 200 can secure one (or several) items of personal property 150 using a cable 235. The cable 235 selected may be relatively long, or shorter, as selected by the user. As described herein, the lock assembly 200 is configured for use with cables 235 of different lengths, or with a solid U-shaped shackle (like that of a traditional padlock), or with other types of shackles. The cable 235 may include a sensor element 236, as shown and described herein, according to particular embodiments.

A traditional padlock has a solid U-shaped shackle and a body or housing with openings for receiving the heel and toe ends of the shackle, and for receiving a key that operates a locking mechanism inside the housing. In many padlock designs, the shackle heel is secured in the housing and may be spring-mounted. The shackle toe or free end includes a notch or recess, which engages with a locking bar to secure or lock the shackle within the housing when locked. The locking mechanism includes a keyway for receiving a key, which may turn a series of tumblers and pins for operating the lock.

Figure 3:
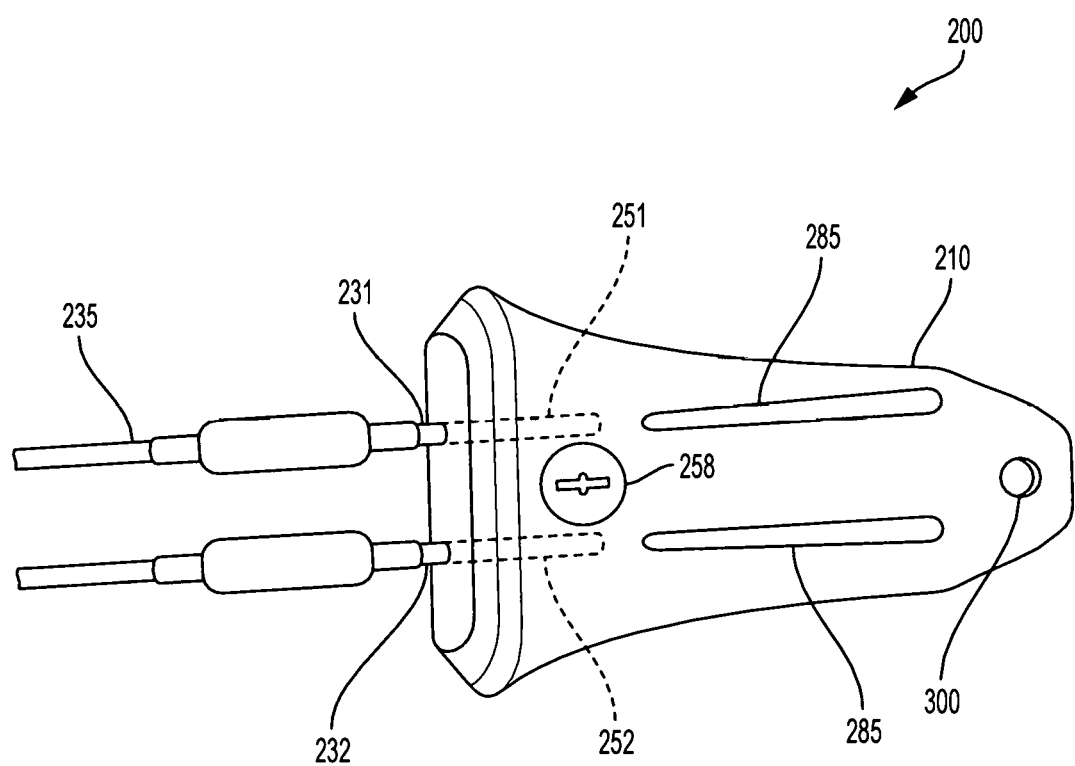
FIG. 3 is a perspective illustration of a lock assembly with one or more LED lamp assemblies, according to particular embodiments.

Referring to FIG. 3, the lock assembly 200 of the present invention includes a housing 210 and first and second pinways 251, 252 that are sized and shaped to receive first and second shackle pins 231, 232, respectively. The lock assembly 200 may include a keyway 258 and a key, or an alternative locking assembly for securing and locking the shackle pins 231, 232 once inserted into the housing 210. For example, an alternative locking assembly may include a padlock having a shackle for insertion into and through the housing 210 at a position where it secures the shackle pins 231, 232 inside the housing 210.

Each shackle pin 231, 232 may be selectively removable from the housing 210, unlike most padlock designs. The shackle pins 231, 232 may be located on the opposing ends of a cable 235. In this aspect, the cable 235 acts as a flexible shackle. One or both shackle pins 231, 232 may include a recess that is sized and shaped to engage with a locking bar inside the housing, which is operated using a key in the keyway 258 or by using an alternative locking assembly, as described.

As shown, the housing 210 may include may include one or more slots or holes 300 for receiving straps, ropes, or other tethering devices which may be useful for carrying the lock assembly 200 or for positioning or securing it at a desired location.

The housing 210 may include one or more lamps 285 for displaying the status or condition of the lock assembly, to indicate Ready, Locked, Alarm, and the like. The lamps 285 may be light-emitting diodes (LEDs) and may be configurable by the user, including variations in color, brightness, and blink pattern. The lamps 285 may include one or more lamps positioned on one or more sides of the housing 210 in order to facilitate viewing from different perspectives.

The openings to the first and second pinways 251, 252 may be positioned on the rear face of the housing 210. According to one embodiment, the pinways 251, 252 are spaced 1.25 inches apart. The pinway openings and/or other openings on the housing 210 may be protected with a door, a flap, or other type of covering in order to protect the interior components from water and the elements. According to particular embodiments, the other openings on the housing 210 may include a power button, a charging port, and a camera.

Figure 4:
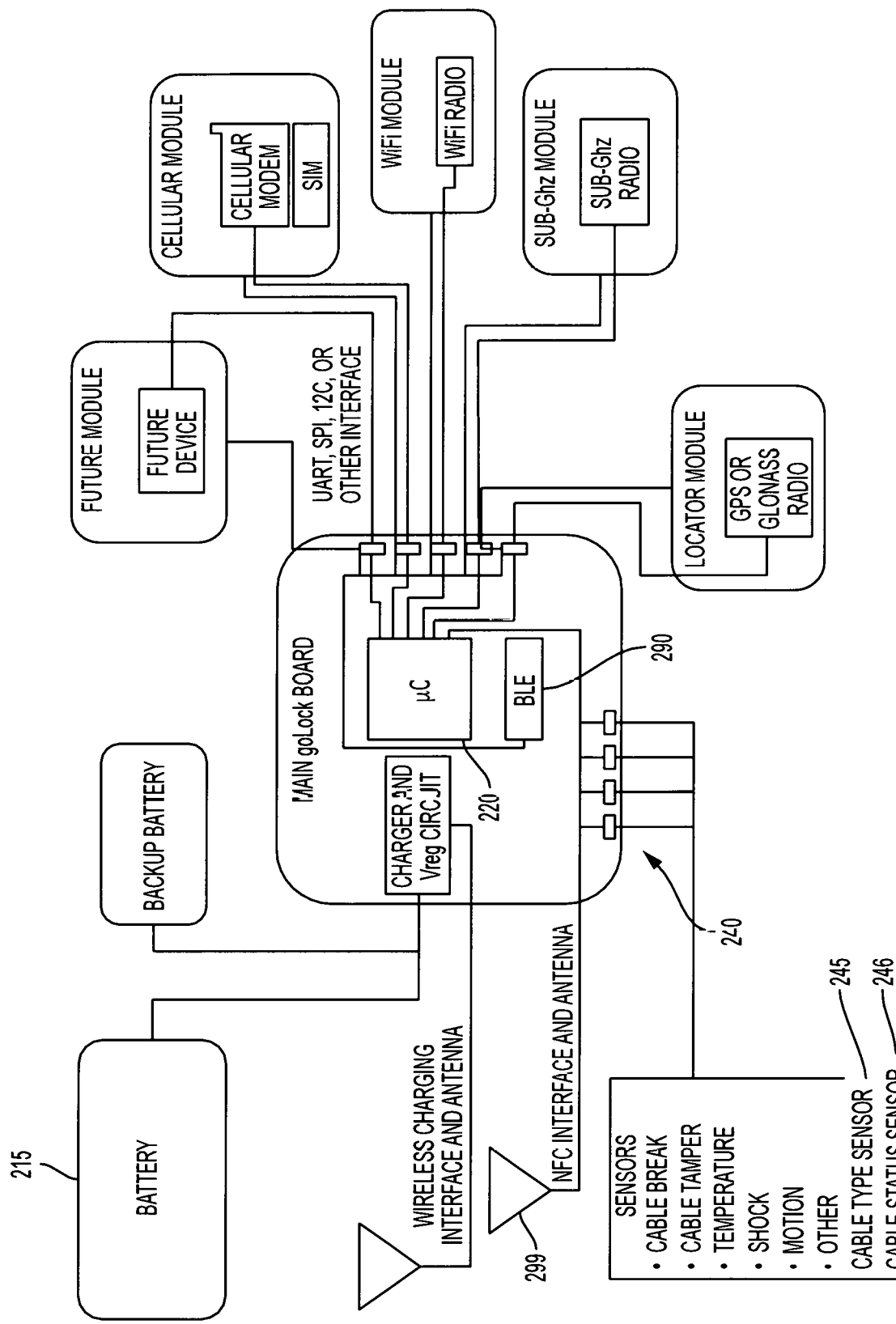
FIG. 4 is a schematic illustration depicting the connections among and between a battery, antenna, sensors, microcontroller, interfaces, and communications modules for a lock assembly, according to particular embodiments.

FIG. 4 is a schematic illustration depicting the connections between and among a power supply 215 or battery, and NFC interface and antenna 299, one or more sensors, a microcontroller 220, and interfaces with one or more communications modules, according to particular disclosed embodiments. The microcontroller 220, often abbreviated uC or μC (as in the figure), is a small computer on an integrated circuit board which is used to control electronic devices. The microcontroller 220 typically includes a processor core, a memory, and programmable input/output peripherals.

The elements shown schematically in FIG. 4 are located within the housing 210 of the lock assembly 200. The power supply 215 or battery, as shown, may include a secondary or backup battery, and may be connected to the microcontroller or uC 220 which is positioned on an integrated circuit board which is labeled as the Main goLock Board. Also on the board is a charging and voltage regulator (Vreg) circuit. The charging interface may be wireless and/or may include a charging port such as a micro-USB type.

Also on the Main goLock Board, according to particular embodiments, is a BLE transceiver 290. Bluetooth Low-Energy (BLE or Bluetooth Smart) is a wireless network technology designed and marketed by the Bluetooth Special Interest Group. BLE is intended to provide a communication range similar to Classic Bluetooth but with considerably reduced power consumption and cost. The BLE transceiver 290 is configured to communicate with one or more remote or mobile devices 15, 17-20 including a smart phone 20 or tablet computer 18, as described herein. The microcontroller 220 includes a memory and a processor core capable of executing a number of commands and responses.

Instead of (or in addition to) the BLE transceiver 290, the system may include one or more other communications modules, as shown in FIG. 4, including a cellular modular, a WiFi module, a sub-gigahertz radio, and a locator module (for example, GPS or GLONASS). The system may also include UART, SPi, i2C, or other types of interfaces, as shown.

The sensor assembly 240 may include sensors to detect whether a pin has been inserted into one of the pinways, according to particular embodiments. In this aspect, the sensors may include a first pinway sensor (positioned to sense the presence or absence of a first shackle phi 231 in the first pinway 251, as illustrated in FIG. 3) and a second pinway sensor (positioned to sense the presence or absence of a second shackle pin 232 in the second pinway 252).

The sensor assembly 240 may also include a cable type sensor 245 for detecting the type of cable that is inserted, including its length (as described herein). The sensor assembly 240 may also include a cable status sensor 246 for detecting the status, integrity, or condition of the cable. For example, the cable status sensor 246 may be configured to sense a cable interrupt event, such as a cable break or cut, and to sense cable tampering (a shock or insult to the cable without necessarily breaking it). The sensor assembly 240 may also include a variety of other types of electromechanical sensors for detecting temperature, shock, motion, and other conditions. The sensor assembly 240 may also include a camera.

Cable Type and Status:

The cable assembly 230, according to particular embodiments, includes a cable 235, first and second shackle pins 231, 232 at the cable ends, and a sensor element 236 (as illustrated schematically in FIG. 2) such as a resistive wire, carbon filaments, a coaxial conductor, or the like. The sensor element 236 may be positioned along all or part of the length of the cable 235.

In use, the sensor element 236 enables the cable type sensor 245 to sense and detect the type of cable currently in use, including its type (cord, wire, plastic-coated cable, for example) and its length. The cable type and length may be sensed, transmitted, registered, and stored on the access system 60 (mobile app) which is running on a mobile device 15. In this aspect, a specific cable 235 may be associated with a particular lock assembly 200. Any change in the cable type or length will trigger an alarm status.

In use, the sensor element 236 enables the cable status sensor 246 to sense and detect the status, integrity, or condition of the cable. For example, a sensor element 236 such as a coaxial conductor running along the entire length of the cable 235 would sense a cable interrupt event, including a cable break or cut. The sensor element 236 may also be configured to sense cable tampering, such as a shock or insult to the cable that does not completely break it.

Figure 5:
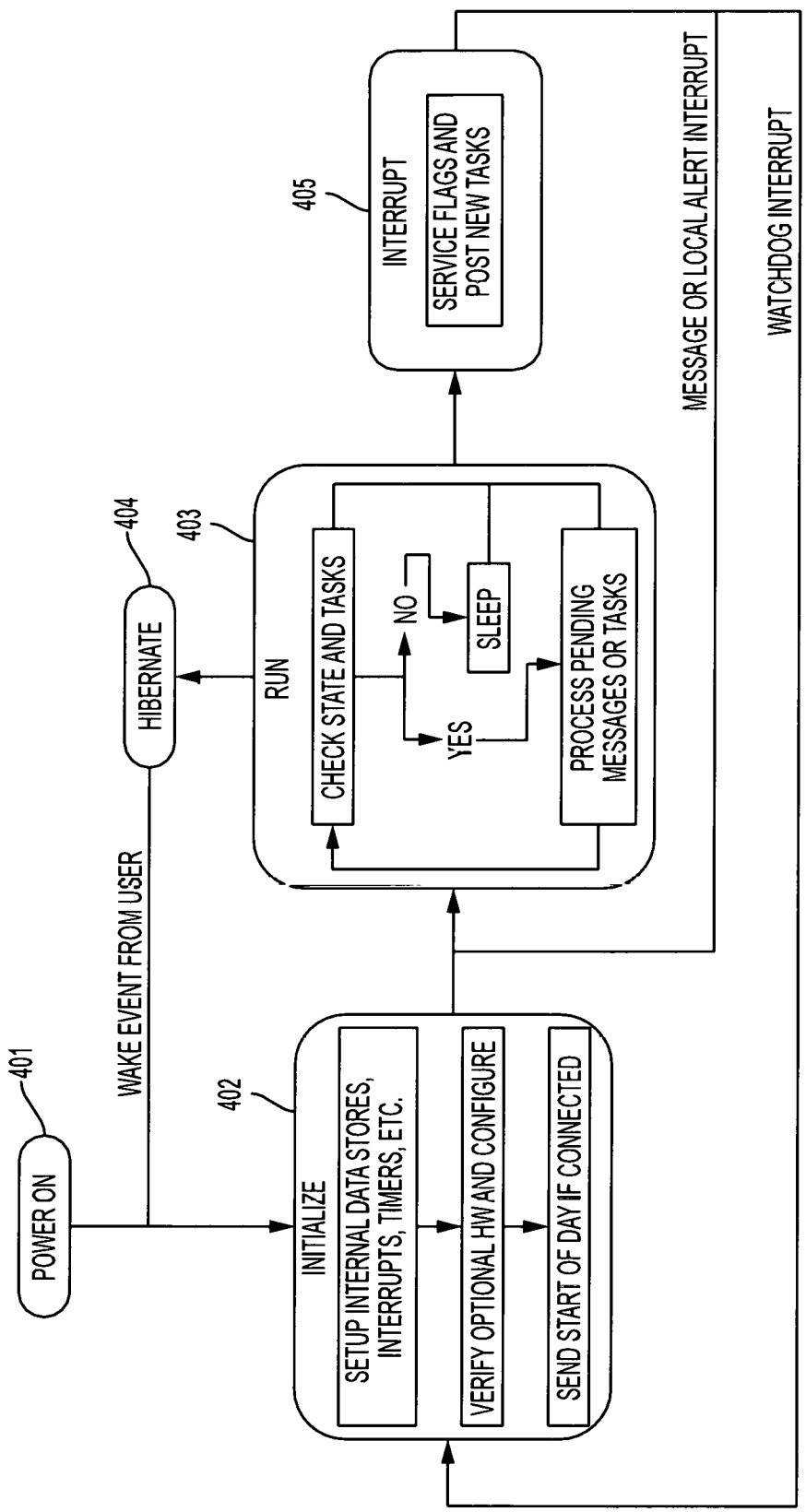
FIG. 5 is a flow chart depicting the some of the steps for a lock assembly, according to particular embodiments.

FIG. 5 is a flow chart depicting the some of the steps in controlling the power and wake status for the lock assembly 200, according to particular embodiments. Starting with the Power On event 401, the Initialize routine 402 may include setup steps, verification, and communications routines, as shown, before the system enters Run status 403. As shown, the system may enter a sleep or Hibernate mode 404 during periods of inactive use, while of course maintaining sensor vigilance for detecting any Interrupt condition 405.

Setup and Operation

Figure 6:
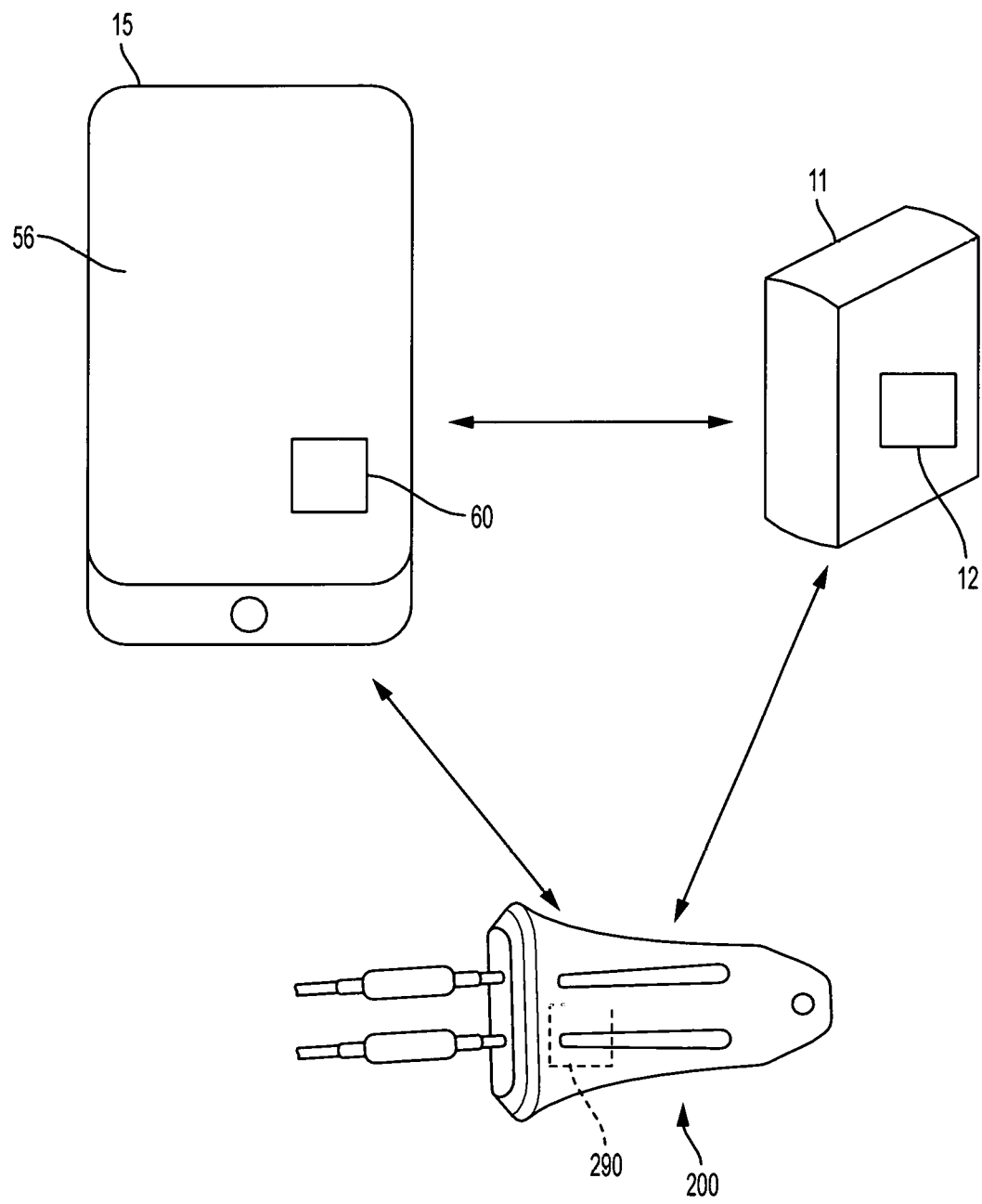
FIG. 6 is a schematic illustration depicting the connections among and between a mobile device, a server, and a lock assembly, according to particular embodiments.

FIG. 6 is an illustration of the system, according to particular embodiments, which may include a mobile device 15 such as a smart phone, a server 11, and one or more lock assemblies 200. As shown, the three elements—the mobile device 15, the server 11, and the one or more lock assemblies 200—may be in communication with one another, over a network such as the Internet, as described herein. A mobile application, referred to herein as the access system 60, may be installed on a user's mobile device 15. A database 12 may be installed on the server 11, as shown. The server 11 may be a cloud-based server configured to connect via the Internet, as described herein.

The lock assembly 200 may include a battery, as described herein. The battery may be disabled during the manufacturing process in order to maintain its integrity during packaging, shipment, and transit. Once enabled, the battery provides electric power to components in the lock assembly 200 such as the microcontroller 220 and the BLE transceiver 290, shown in FIG. 4. The BLE transceiver 290 may be configured to communicate over a network (such as the Internet) with both the mobile device 15 and with the remote server 11.

The access system 60 or mobile app may include a user interface for creating a new account, for sensing and pairing with a particular lock assembly 200, and for registering user information and information about the lock assembly 200. After creating a new account, the mobile device 15 may be configured to verify the account, confirm that a user account does not already exist, and open a new account on the server 11. The access system 60 may be configured to send the data about the new account to the server 11.

Figure 7:
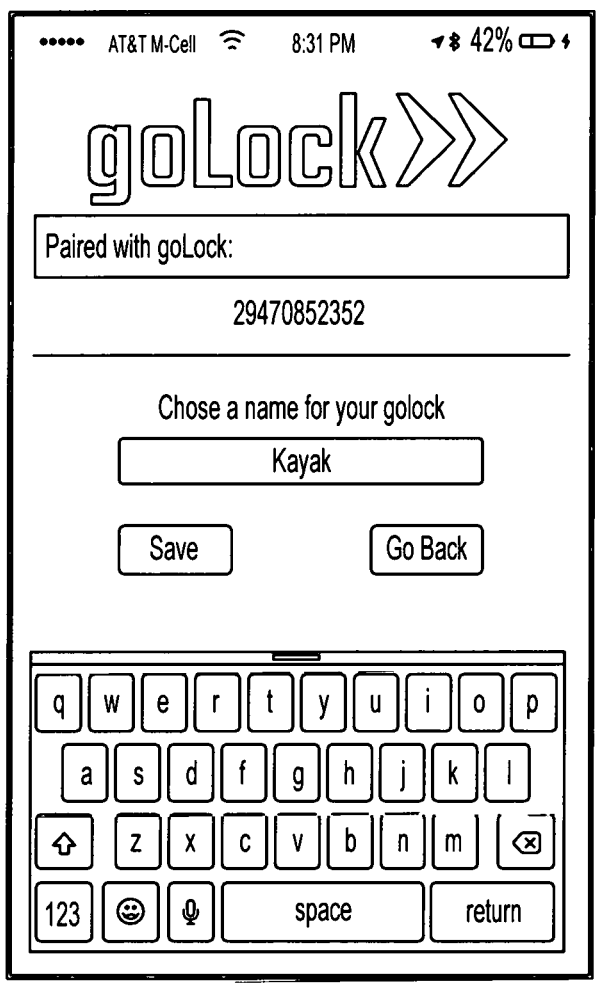
FIG. 7 is an illustration of a sample display screen on a mobile device, showing the pairing process, according to particular embodiments.

Next, the access system 60 may send a signal to the lock assembly 200 that contains instructions to turn on or otherwise activate the onboard BLE transceiver 290. The BLE transceiver 290 may be configured to search for nearby lock assemblies 200 that are not already paired with the access system 60 on the mobile device 15. As described herein, the BLE transceiver 290 supports a two-way Bluetooth communication between the access system 60 and the lock assembly 200 in order to enable a pairing process. For example, the access system 60 may display to the user an identifier associated with a particular lock assembly 200 (such as a serial number) and start the process of pairing the lock assembly 200 with the access system 60. Once pairing is completed, the user may have the option of assigning a custom name for the lock assembly 200 (such as "Kayak" as illustrated in FIG. 7) and the access system 60 may send data and information related to the pairing to the server 11 for registration and storage in the database 12.

The access system 60 may be configured to send a request to the lock assembly 200 and thereby retrieve the current configuration and status, which can then be presented on the display 56 for the mobile device 15.

The access system 60 may include a menu of options for the user, including an Arm command associated with each of the registered lock assemblies 200. If the mobile device 15 is within Bluetooth range of the lock assembly 200, the Arm command may be sent via Bluetooth signal. If the mobile device 15 is not within Bluetooth range, the Arm command may be sent over a network such as the Internet to the server 11, and the server 11 will relay the Arm command to the lock assembly 200. Then, in turn, a confirmation from the lock assembly 200 will be relayed by the server 11 to the mobile device 15.

When an Alarm condition arises for the lock assembly 200, the lock assembly 200 may (1) sound a local alarm, (2) broadcast an alarm message via Bluetooth in the event the mobile device 15 is within range, (3) transmit an alarm message to the mobile device 15, and/or (4) transmit an alarm message to the server 11. The server 11 may send the alarm message via push notification to the mobile device 15. The alarm message may include the nature or detected cause of the alarm condition—for example, a cable break, cable pin removal, or cable insult.

The lock assembly 200 may also be configured to sound a local alarm. The local alarm may be configurable for type (audible siren, tactile vibration, LED display, for example) and for characteristic (pattern, tone, volume, duration, repetitions, and the like). The local alarm, for example, may include flashing and/or changing the color of the lamps 285 on the housing 210.

In response to the incoming alarm, the access system 60 on the mobile device 15 may be configured to silence or otherwise react to the alarm on the mobile device 15. The mobile device 15 may be configured to silence the local alarm at the lock assembly 200, without disarming the locking mechanism.

Figure 8:
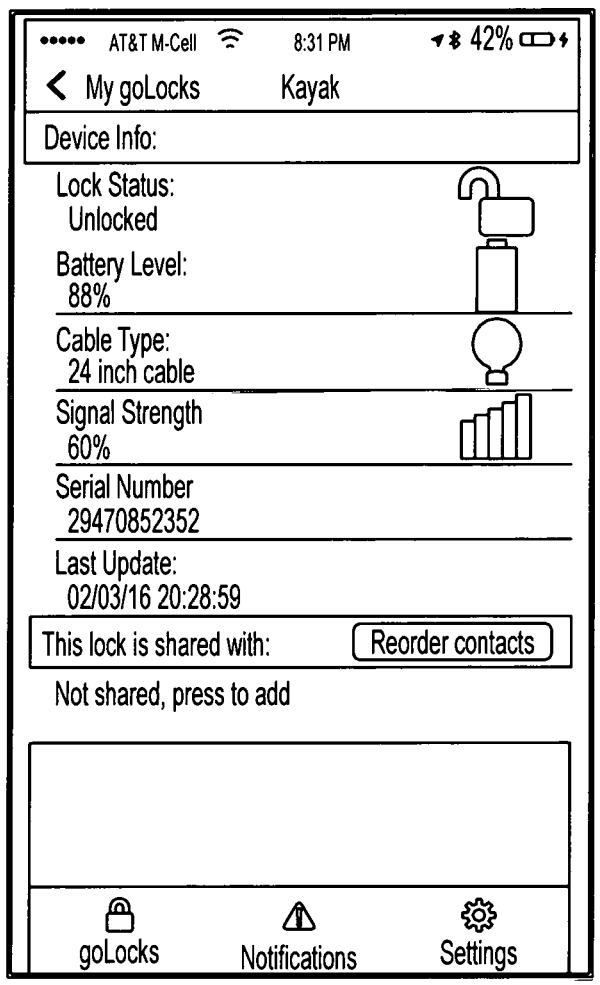
FIG. 8 is an illustration of a sample display screen on a mobile device, showing the status of selected lock assembly, according to particular embodiments.

During normal operation, the access system 60 on the mobile device 15 may be configured to occasionally poll the lock assembly 200 in order to retrieve operational and status information, including such data as battery level, signal strength, cable status, and the like. The data may be displayed on the mobile device 15, as illustrated in FIG. 8. The polling request may be relayed by the server 11 to the lock assembly 200; the server 11 in turn will relay the information back to the mobile device 15. As shown in FIG. 5, the microcontroller 220 may be configured to include various operational modes, including Initialize, Run, Interrupt, Sleep, and Hibernate. As shown, receiving a Check State or other command received from the mobile device 15 (or from the server 11) will temporarily stop the Hibernate mode and/or Sleep mode and the microcontroller 220 will process the incoming commands) and send the appropriate response.

Figure 9:
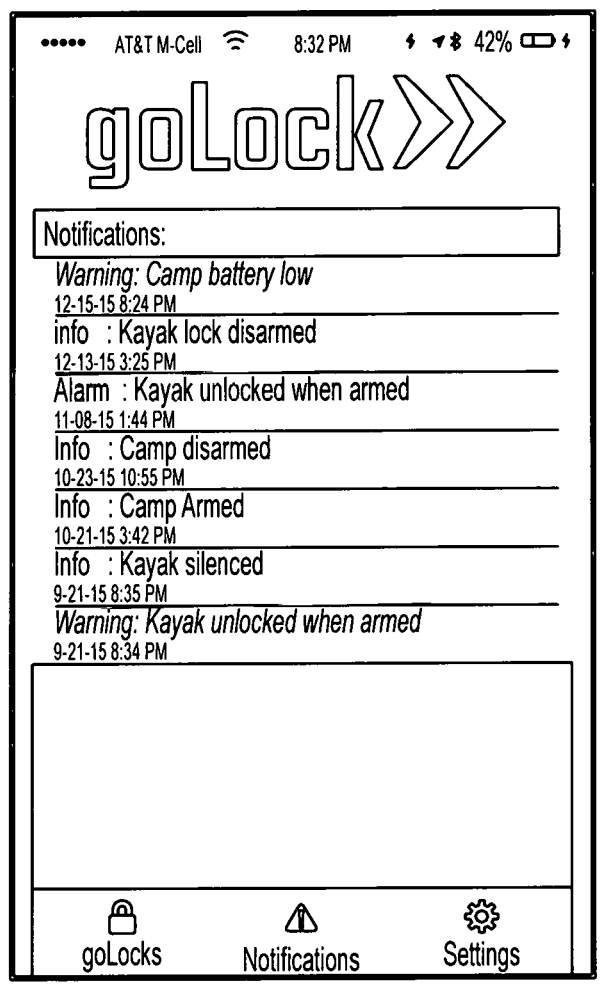
FIG. 9 is an illustration of a sample display screen on a mobile device, showing the status of a number of lock assemblies, according to particular embodiments.

The access system 60 on the mobile device 15 may be configured to register a number of contacts, some of whom are authorized using the access system 60 to access and open one or more select lock assemblies 200. A number of different lock assemblies 200 may be monitored and controlled using the access system 60 on the mobile device 15, as illustrated in a screen capture in FIG. 9.

An authorized contact may install the mobile app (access system 60) on their mobile device 15 and thereby interact with the user. In this aspect, the user may select and authorize certain contacts to access and use one or more of the select lock assemblies 200. For example, the user may authorize Adam to access and open the "Kayak" lock assembly 200; and may authorize Betty to access and open the "Kayak" and the "Bicycle" lock assemblies 200 using the access system 60. The access system 60 may be configured to include ready access to the telephone and text-messaging systems on the mobile device 15 so that the user may communicate with a selected contact, such Adam or Betty, for example, who may be near an item of locked personal property 150 and seeking access to the lock assembly 200.

The access system 60 on the mobile device 15 facilitates remote control and operation of the lock assembly 200 by a user, including situations where a contact or another person is near the lock assembly 200. For example, the user may use the mobile device 15 to send a Disarm signal to unlock a selected lock assembly 200 so that the local person can access and use the item. After the Disarm signal is received and the lock assembly 200 is unlocked, the local person can remove one or both shackle pins 231, 232 (which opens or releases the cable assembly 230) and use the property 150. In another aspect, the lock assembly 200 may also include a shackle pin ejector 260 that is configured to selectively and forcefully eject one or both shackle pins 231, 232 of the cable assembly 230.

Command Sets:

In another aspect, according to particular embodiments, the systems described herein may include a command set, including a series of commands, responses, parameters, and selected users. The command set, as described, is common to all the systems, including (1) the microcontroller 220 inside the housing 210 of the lock assembly 200, (2) the access system 60 (or mobile app) on the mobile device 15, and (3) the account system 100 on the remote server 11. The command set operates with any communication module that might be in use between and among the lock assembly 200, the mobile device 15, and the server 11. In this aspect, the command set is mode-agnostic.

| COMMAND | PARAMETERS | RESPONSE | USER | NOTES |
|---|---|---|---|---|
| Get Firmware Version | None | Current firmware version on the goLock assembly. | Owner | |
| Get Firmware Checksum | None | Checksum of current firmware image | Owner | To verify integrity of firmware; e.g., after an update and/or to ensure firmware has not been tampered with. |
| Arm Lock | None | OK | Owner and assigned | Owner has full access. Other shared users can be assigned access level by the owner. |
| Disarm Lock | None | OK | Owner and assigned | |
| Silence Alarm | None | OK | Owner and assigned | |
| Acknowledge Alert Message | None | OK | All Receivers | Causes Lock or Server to stop sending Alert messages to the sending user ID. This Command functions on a per user basis. |
| Get Device Status | Data Type | Battery level, lock status, cable status, cable type, signal strength for each radio, temperature, configurable settings such as LED, alarm delay, etc. | Owner and assigned | Data Type meaning which status data to return, Summary, Critical, All, etc. Selectable to save GSM bandwidth. |
| Set LED | Brightness Value (1 to 10) | OK | Owner | Assumes brightness can be controlled via PWM. All colors would have to change together or else you are shifting the hue. |

-continued

| COMMAND | PARAMETERS | RESPONSE | USER | NOTES |
| --- | --- | --- | --- | --- |
| Alarm Off Delay | Value in seconds, Alert Type | OK | Owner | Allow user to configure the amount of time the Alarm sounds before turning off, if not otherwise reset by the user. Settable for each different Alarm type (Alert, Warn, Etc.) |
| Set Sensor Sensitivity | Sensor ID, Level Setting | OK | Owner | Setting (Low, Med, High, Off) of selected analog Sensor. |
| Update User List | User identifier, access level | OK | Owner | Register (or remove) a Contact, for additional users of the lock, and set the access level for each user. Only the Owner/Primary user has access to all admin functions. |
| Get User List | None | Current User list and settings | Owner | Return the Contact info and access settings for additional users of the lock, and set access level for each user. |
| Set Broadcast Message Mode | Updated Broadcast Level | OK | Owner | Set the Broadcast message level which determines with groups of Contacts who get notified about certain Lock Status changes. |
| Get Broadcast Message Mode | None | Current Broadcast Level | Owner | Return the current Broadcast message level, which determines which Contacts or groups of contacts get notified about certain Lock Status changes. |

The following command sets may be available only in diagnostic or development builds, and/or may be accessible for service and troubleshooting purposes, and may be hidden from the end user.

| COMMAND | PARAMETERS | RESPONSE | USER | NOTES |
| --- | --- | --- | --- | --- |
| Get Device Serial Numbers and Identifiers | None | All relevant ID's | Development | Diagnostic and manufacturing only. Removed when shipped. |
| Set Alarm Level | Off, Low, Medium, Hi | OK | Development | |
| Set Alarm Frequency | Value between 0 and 4Fh | OK | Development | For testing and setup only. This would be to tweak and tune the PWM Frequency for different speaker selections. |
| Disable Bluetooth | Amount of time to disable | OK | Development | For testing only. Device will re-enable Bluetooth after the specified time frame. |
| Disable Radio | Radio, true/false | OK | Development | Enable or disable GSM, LTE, Sub-Gigahertz, or other radio used. |
| Sensor Thresholds | Sensor, Threshold, Level Setting | OK | Development | Alert and Warn Thresholds and Hysteresis of analog sensors. |
| Update Firmware | Binary image | OK | Diagnostics and/or Development | For uC and any other programmable devices. Final solution may allow for |

-continued

| COMMAND | PARAMETERS | RESPONSE | USER | NOTES |
|---|---|---|---|---|
| Get Cable State | None | Continuity or No Continuity; Cable Impedance (if connected) | Diagnostics and/or Development | maintenance push from server. |
| Tune LEDs | RGB brightness values as percent | OK | Development | For testing and setup only. This would be to tweak and tune the color projection in different case setups. |
| Dump Diags | Requested Data Identifier | Requested Data | Diagnostics and/or Development | Store selected diagnostic data in non-volatile memory. |
| Heartbeat | None or State Summary | OK | Development | Development configurable "heartbeat" interval. App to Lock. |
| Get Extended Sensor Data | Sensor Number | Raw Sensor Data | Diagnostics and/or Server (long-term analysis software) | Allows server to collect and develop trends using long-term sensor data; may be used to analyze trends, predict failures, etc. |
| Change Encryption Key | New Key | OK, encrypted with new key. | Customer Support | In the event a lock gets hacked, change the encryption key to protect the device. |

The following command sets may be sent unsolicited and asynchronously from the lock assembly 200 to the server 11 and/or to the mobile device 15.

| COMMAND | PARAMETERS | RESPONSE | USER | NOTES |
|---|---|---|---|---|
| Alarm Alert | Source, Severity | OK | Lock | Cable break, motion sensor, Shock sensor, Temp, Signal or other. Red or Yellow. |
| Lock Heartbeat | None or State Summary | OK | Lock | Development configurable "heartbeat" interval. Start of Day and/or Enter Runtime Notification. |

Mesh of Nodes in a Network:

In another aspect, one or more lock assemblies 200 may be used in a network or mesh for the purpose of communicating with one or more selected mobile devices 15 and/or with one or more remote servers 11. For example, a user (or set of users) may have a number of lock assemblies 200 deployed in a particular area, which may be in remote or wilderness areas. The local computer or microcontroller 220 on each lock assembly 200 may be configured to communicate with other lock assemblies 200 (selected and identified through an interface, or selected by default to participate in the mesh) so that a superset of lock assemblies 200 together may act as a communication network. The network or mesh 113 may be secured and limited to lock assemblies 200 only, excluding participation by other wireless devices. In use, the network or mesh 113 of lock assemblies 200 will facilitate communication, across remote wilderness or other wide areas, which would otherwise be more difficult or impossible. In this aspect, the lock assemblies 200 are configured to act as nodes in the mesh so that signals, including alarm messages, can be relayed among and between participating elements in the mesh, to further insure that the user will receive current information and data on his or her mobile device 15.

Although several embodiments have been described herein, those of ordinary skill in art, with the benefit of the teachings of this disclosure, will understand and comprehend many other embodiments and modifications for this technology. The invention therefore is not limited to the specific embodiments disclosed or discussed herein, and that may other embodiments and modifications are intended to be included within the scope of the appended claims. Moreover, although specific terms are occasionally used herein, as well as in the claims that follow, such terms are used in a generic and descriptive sense only, and should not be construed as limiting the described invention or the claims that follow.

The invention claimed is:

1. A lock assembly, comprising:
   a cable assembly comprising a cable having a sensor element disposed along its length, a first shackle pin on its first end, and a second shackle pin on its opposing end;
   a housing defining a first pinway for receiving said first shackle pin, a second pinway for receiving said second shackle pin, and a locking mechanism for securing said shackle pins to said housing;
   a sensor assembly within said housing and in communication with said cable assembly for sensing a cable type and a cable condition related to said cable assembly; and a wireless transceiver connected to a power source, in communication with said sensor assembly, and operated by a microcontroller within said housing, wherein said transceiver is configured to communicate with a remote mobile device and a remote server.

2. The lock assembly of claim 1, wherein said sensor element is a material selected from the group consisting of a resistive wire, one or more carbon filaments, and a coaxial conductor.

3. The lock assembly of claim 1, wherein said sensor assembly is in communication with a microcontroller and a power source associated with said housing, said sensory assembly comprising:
- a cable type sensor for detecting cable type and cable length; and
- a cable condition sensor for detecting cable integrity along at least part of said length.

4. The lock assembly of claim 1, wherein said locking mechanism comprises a padlock having a shackle sized and shaped for insertion into and through said housing to secure said shackle pins.

5. The lock assembly of claim 1, wherein said wireless transceiver comprises a Bluetooth low-energy transceiver.

* * * * *